(No Model.)
G. L. ROLLINS.
FRICTION CLUTCH PULLEY.
No. 406,063.  Patented July 2, 1889.
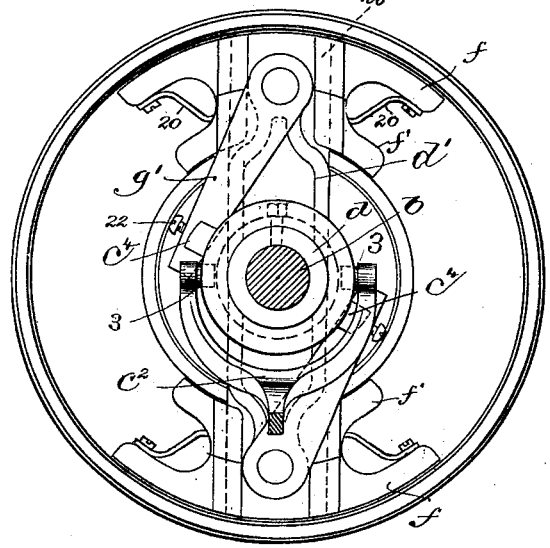
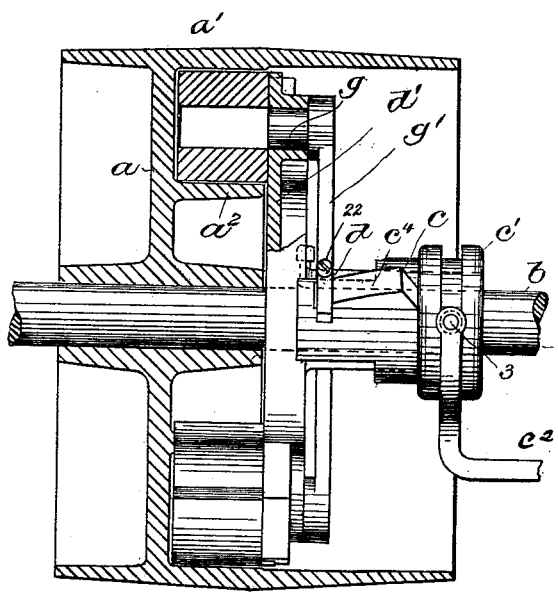
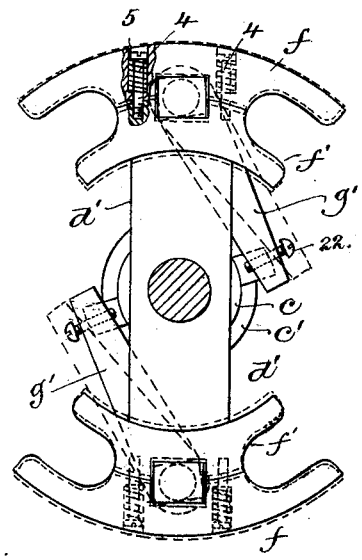
Witnesses
Howard A. Eaton
John F. C. Prindle
Inventor,
George L. Rollins.
by Crosby & Gregory attys.

UNITED STATES PATENT OFFICE.

GEORGE L. ROLLINS, OF BRIDGEWATER, MASSACHUSETTS.

FRICTION-CLUTCH PULLEY.

SPECIFICATION forming part of Letters Patent No. 406,063, dated July 2, 1889.

Application filed February 7, 1888. Serial No. 263,253. (No model.)

*To all whom it may concern:*

Be it known that I, GEORGE L. ROLLINS, of Bridgewater, county of Plymouth, State of Massachusetts, have invented an Improvement in Friction-Clutch Pulleys, of which the following description, in connection with the accompanying drawings, is a specification, like letters on the drawings representing like parts.

This invention has for its object to construct a friction-clutch pulley which shall occupy very small space on a machine, be durable, and be easily and quickly operated.

In accordance with this invention the belt-pulley is mounted loosely upon the shaft, it having, preferably, two annular flanges—one at its periphery and the other between its periphery and the hub of the pulley.

The friction-clutch device, forming the stationary member of the pulley, consists of a sleeve or hub fixed to the shaft and supporting one or more radially-extended guide-plates and one or, preferably, two friction-plates, the latter being adapted to slide on each radially-extended guide-plate between the two annular flanges of the loose belt-pulley, so that when said plates are moved or separated one from the other they will engage the flanges of the pulley. If one friction-plate only is used, one of the flanges of the loose belt-pulley will be omitted. I have provided means for separating the friction-plates to engage the flanges, the said means being under the control of a moving inclined or wedge block operated by a shipper-lever.

To make the pulley as compact as possible, the inclined or wedge block is arranged to be moved longitudinally with relation to the shaft and to reciprocate a square or other than round shaft interposed between the friction-plates.

Figure 1 shows in side elevation a friction-clutch pulley embodying this invention; Fig. 2, a partial left-hand side elevation and section of the pulley shown in Fig. 1; and Fig. 3, a detail of the friction-plates, the loose pulley being removed.

The belt-pulley $a$ is mounted loosely upon the shaft $b$, said pulley having an outer or peripheral flange $a'$ and an inner flange, as $a^2$, between the flange $a'$ and the hub of the pulley.

The stationary member of the pulley consists of a sleeve or hub $d$ fixed to the shaft $b$, it supporting one or more guide arms or frames $d'$, two being herein shown extending radially from the shaft, the said guide-arms receiving upon them and guiding two friction-plates $f\ f'$, having curved engaging surfaces, and having at their rear sides suitable grooves 26 (shown in dotted lines, Fig. 1) to embrace the said guides or frames. The friction-plates $f\ f'$ are drawn toward each other by springs 20, (see Fig. 1,) one end of each spring being connected with the plate $f$ and the other end with the plate $f'$; or, in lieu of said springs, the friction-plate $f$ may be socketed (see Fig. 3) to receive loosely the screws 4, which enter threaded holes in the plate $f'$, spiral springs 5, through which the said screws are passed, serving normally to keep the said plates $f\ f'$ pressed the one against the other or contracted in the space between the outer and inner flanges of the pulley. A shaft $g$, having its bearings in the guide frame or arm $d'$ and having one of its ends square or other than round in cross-section and entered between the two friction-plates $f\ f'$, has a short arm, as $g'$, preferably provided at its outer end with an adjusting-screw 22. The hub $d$ has on it a longitudinally-movable sleeve $c$, having an annularly-grooved hub $c'$, the said groove receiving pins or studs 3 of a yoke $c^2$, forming part of or attached to a shipper-lever of any usual or suitable construction. The sleeve $c$ is provided with one or more longitudinally-inclined or wedge blocks or projections, as $c^4$, two being herein shown.

The adjusting-screw 22 at the end of the arm $g'$ bears upon the inclined or wedge block $c^4$, so that as the sleeve $c$ is moved longitudinally upon the hub $d$ the said inclined or wedge block turns the arm $g'$ and rotates the shaft $g$, so that its squared end between the plates $f\ f'$ separates said plates, thus forcing them against the flanges $a'\ a^2$ of the loose belt-pulley $a$, so that the belt-pulley in its rotation carries the shaft $b$ with it.

I have herein shown two guide arms or frames $d'\ d'$, and hence I shall preferably use two friction-plates $f\ f'$ for each guide-frame, as shown; yet it is obvious that only one pair of friction-plates need be employed.

It will be seen that the clutch devices herein shown are mainly contained within the chambered end or flange $a'$ of the pulley, that the pulley and its clutch may occupy as little space as possible, compactness being especially desirable in connection with some machines, such as cotton-gins.

I claim—

1. In a clutch, the combination of the shaft $b$, a pulley loosely mounted thereon having a peripheral and a concentric internal flange, a guide-arm, and a pair of normally contiguous friction-plates sliding thereon, combined with an oscillating shaft $g$, interposed between the said friction-plates, one of the diameters of which is greater than another, an arm $g'$, fixed to said shaft $g$ at a right angle, and thereby moving in a plane at right angles to the shaft $b$, the longitudinally-sliding sleeve, and the inclined-surfaced block thereon for moving said arm $g'$ to oscillate the shaft $g$ and thereby separate the friction-plates, all substantially as described.

2. In a clutch, the shaft $b$, the flanged pulley loose thereon, the guide-arms, and friction-plates sliding thereon, and the quadrangular oscillating shafts $g$ for moving the said friction-plates, said shaft lying parallel with the shaft $b$, combined with the arms $g'$, fixed at right angles to the shafts $g$ and having the adjusting-screws 22, and the longitudinally-sliding sleeve having the inclined-surfaced blocks thereon for moving said arms $g'$, all substantially as and for the purposes specified.

In testimony whereof I have signed my name to this specification in the presence of two subscribing witnesses.

GEO. L. ROLLINS.

Witnesses:
G. W. GREGORY,
B. DEWAR.